Feb. 23, 1954   H. A. PURSCHE   2,669,818
DISK HARROW
Filed May 10, 1948   2 Sheets-Sheet 2
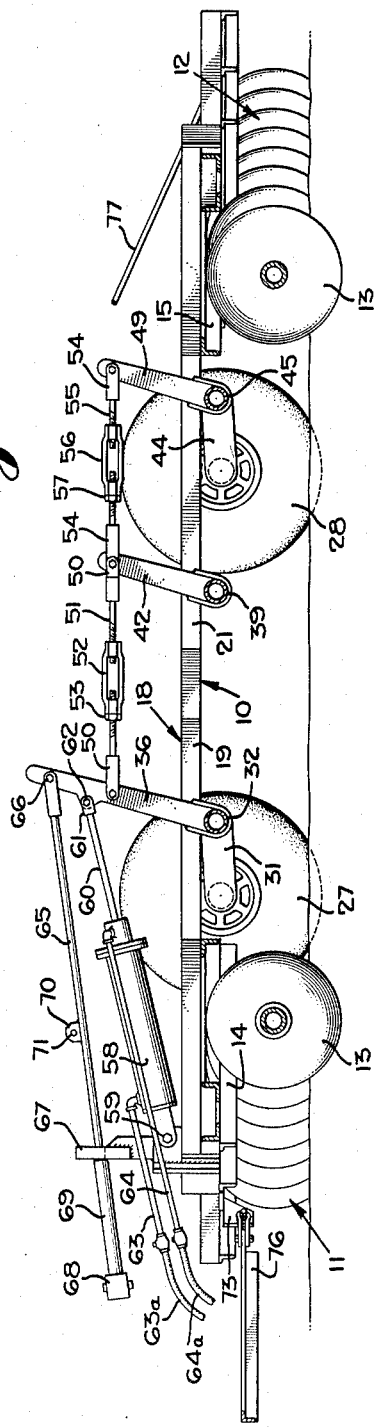
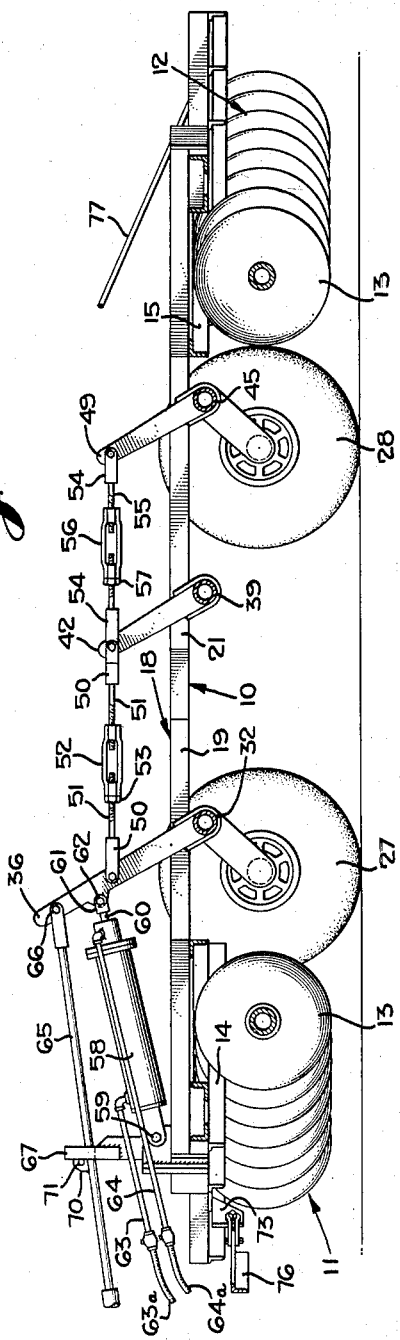
INVENTOR,
Harry A. Pursche.
BY
Lyon & Lyon
ATTORNEYS Patented Feb. 23, 1954

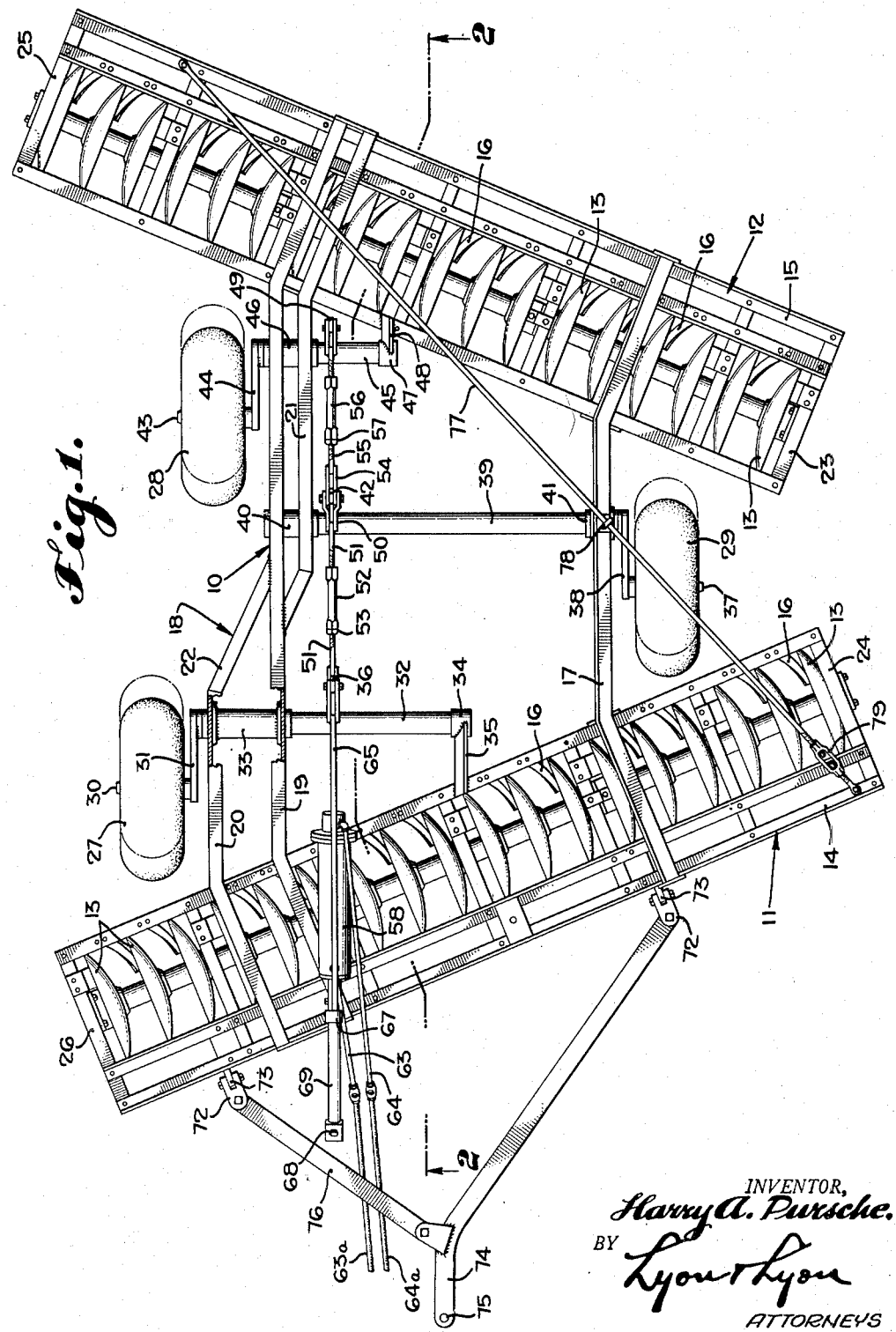

2,669,818

UNITED STATES PATENT OFFICE 2,669,818

DISK HARROW

Harry A. Pursche, Gardena, Calif.

Application May 10, 1948, Serial No. 26,041

10 Claims. (Cl. 55—73)

1

This invention relates to agricultural implements and is particularly directed to improvements in disk harrows.

The principal object of this invention is to provide a disk harrow having diverging gangs of disks set at a predetermined angle and having a plurality of ground engaging wheels disposed in a novel fashion to support the device with the disk gangs clear of the ground or to control the depth of operation of said disks.

Another object is to provide novel means for raising and lowering the ground engaging wheels and for adjusting their relative vertical positions.

Another object is to position one of the ground engaging wheels adjacent the forward end of the leading disk gang to minimize the tendency of that end of the forward disk gang to dig into the ground beyond the desired depth.

Another object is to provide a supporting assembly for diverging gangs of disks including a single ground engaging wheel positioned between the converging ends of the disk gangs, and a pair of spaced ground engaging wheels positioned between the diverging ends of the disk gangs, the latter two wheels being relatively offset in order that the rear wheel may not roll in the path left by the front wheel.

Other related objects and advantages will appear hereinafter.

In the drawings:

Figure 1 is a top plan view of a preferred embodiment of my invention.

Figure 2 is a sectional side elevation taken substantially on the lines 2—2 as shown in Figure 1, and showing the disk gangs in ground engaging position.

Figure 3 is a view similar to Figure 2 showing the disk gangs raised clear of the ground.

Referring to the drawings, a frame generally designated 10 is adapted to support a forward disk gang 11 and a rearward disk gang 12. Each of the disk gangs is provided with a plurality of rotatable ground engaging disks 13 of conventional form axially spaced along each of the subframes 14 and 15 respectively. It will be observed that the disks on the forward gang 11 face in one direction, while those on the rearward gang 12 face in another direction in accordance with conventional practice.

Suitable bearing means are provided for rotatably supporting the individual disks on the frames 14 and 15, and cleaner elements 16 of the usual type may extend adjacent the working edge of the disks to avoid build-up of earth. The subframes 14 and 15 together with the individual disks 13 and their associated supporting bearings may be of conventional type.

The frame 10 includes a short beam 17 suitably connected at its ends to the subframes 14 and 15 respectively. The connection may be accomplished by means of bolts or other suitable releasable fastenings or the frames may be welded together if desired. A long beam assembly

2

18 also extends between the subframes 14 and 15 and is joined in a similar fashion to said subframes. The long beam assembly 18 may include beam elements 19, 20, 21 and 22 suitably connected to provide stiffness and rigidity. The short beam 17 and the long beam assembly 18 are secured to the subframes 14 and 15 in a manner to maintain the forward disk gang 11 and the rearward disk gang 12 in fixed angular relationship. As shown in Figure 1, the disk assemblies diverge from adjacent ends 23 and 24 toward the remote ends 25 and 26.

Means are provided for supporting disk gangs clear of the ground and for controlling the depth of operation, and as shown in the drawings this means includes three ground engaging wheels 27, 28 and 29. The forward wheel 27 is positioned adjacent the forward end 26 of the front disk gang 11 and is rotatably mounted on a horizontal axle 30 carried at the lower end of a forwardly projecting crank arm 31. The crank arm 31 is fixed on a front shaft 32 rotatably supported in spaced bearings 33 and 34. The bearing 33 constitutes a stationary sleeve fixed to the long beam frame elements 19 and 20, and the bearing 34 comprises a sleeve carried at the extending end of a strut 35 attached to the subframe 14. A master control lever 36 is fixed on the tubular shaft 32 and extends upwardly therefrom.

In similar fashion the intermediate wheel 29 is mounted on a stationary axle 37 carried at the lower end of a forwardly extending crank arm 38 fixed on the intermediate shaft 39. The shaft 39 is rotatably supported in spaced bearings 40 and 41, the bearing 40 comprising a sleeve fixed to the long beam elements 19 and 21 and the bearing 41 comprising a sleeve carried by the short beam 17. A control lever 42 is fixed on the tubular shaft 39 and extends upwardly therefrom. The rear wheel 28 is rotatably mounted on the stationary axle 43 carried at the lower end of a forwardly extending crank arm 44. The crank arm 44 is fixed on the tubular shaft 45 carried in axially spaced sleeve bearings 46 and 47 mounted on the long beam elements 19 and 21 and on the strut 48 respectively. The strut 48 is secured on the rear subframe 15. A control lever 49 is fixed on the rear shaft 45 and extends upwardly therefrom.

As shown clearly in Figures 2 and 3, the control levers 36, 42 and 49 are mechanically interconnected for dependent operation. Thus clevises 50 pivotally connected to the control levers 36 and 42 are joined by rods 51 and turnbuckle 52. A lock nut 53 may be provided for locking the turnbuckle 52 in adjusted position. In a similar fashion the clevises 54 pivotally connected to the control levers 42 and 49 respectively are connected by rods 55 and turnbuckle 56. A lock nut 57 may be provided for adjusting the turnbuckle 56 in adjusted position.

Power means are provided on the frame 10 for raising and lowering the frame 10 on the supporting wheels 27, 28 and 29. As shown in the drawings this means includes a power cylinder 58 pivotally attached to the frame 10 at 59 and having a rearwardly extending piston rod 60. The piston rod 60 carries a clevis 61 pivotally attached to the master control lever 36 by means of a pivot pin 62. Suitable hydraulic connections 63 and 64 are provided for moving the piston rod 60 in either direction. Flexible hydraulic lines 63a and 64a extend from the lines 63 and 64 respectively to a suitable source of hydraulic pressure preferably mounted on the tractor (not shown) which is used to tow the disk harrow device.

A depth control rod 65 is pivotally attached at 66 to the upper portion of the master control lever 36 and extends through an eye 67 carried on the frame 10. The forwardly extending end of the rod 65 is confined between the nut 68 and the eye 67 and serves as a stop to limit the clockwise movement of the control lever 36 as viewed in Figures 2 and 3. This serves to provide a means of regulating the depth of cut of the disks 13 and the depth may be adjusted by adjusting the nut 68 with respect to the rod 65.

A lug 70 secured to the rod 65 is adapted to pass through the eye 67, and the lug is provided with a central aperture 71 to receive a pin (not shown). The pin may be inserted through the aperture 71 to prevent return of the lug 70 through the eye 67 when the ground engaging wheels are in the position shown in Figure 3, and in this manner the hydraulic cylinder 58 may be relieved of the load required to maintain the disk gangs 11 and 12 in elevated position. This feature is a useful one when the harrow device is to be transported for a considerable distance with the disk gangs 11 and 12 in raised position.

A suitable towing connection is provided for connecting the harrow device to a tractor or other towing vehicle. As shown in the drawings this towing connection includes a pair of clevises 72 pivotally connected to lugs 73 provided on the forward subframe 14. A forwardly extending tow bar 74 may be connected to one of the clevises 72 at one end and provided with a draft connection 75 at the other end. A link 76 may connect the other clevis 72 with the tow bar 74 as shown in Figure 1.

In order to provide additional stiffness it may be desirable to employ a rod brace 77 extending from a position near the end 25 on the rearward subframe 15 to a position near the end 24 of the forward subframe 14. The rod brace 77 preferably passes over a post 78 extending upwardly from the short beam 17. A turnbuckle 79 may be provided for tensioning the rod brace 77 in an obvious manner.

The provision of three ground supporting wheels for my improved disk harrow device avoids the teeter-totter or seesaw effect commonly present in two-wheel harrows in which the forward disk gang may dig into the ground to an objectionable extent while the rearward disk gang is raised partially or completely out of contact with the ground. This objectionable feature is entirely avoided in the device embodying my invention. The forward wheel 27 is mounted in the laterally offset position with respect to the rear wheel 28 in order that the latter may not roll in the track left by the forward wheel 27. Furthermore, this lateral offset enables the forward wheel 27 to be mounted closer to the end 26 of the forward disk gang 11 than would otherwise be the case, and I have found that this is a highly advantageous feature since the forward end 26 of the front disk gang 11 is the end which normally gives the greatest trouble in "diving" or in digging into the ground to a greater depth than desired.

The turnbuckles 52 and 56 afford a convenient and effective means of adjusting the relative position of any one of the ground engaging wheels with respect to the frame 10 and thereby insure optimum contact of the disk gangs with the ground. The stop means provided by the stop sleeve 69 and stationary eye 67 regulates the lowering action of all three wheels simultaneously.

Having fully described my invention, it is to be understood that I do not wish to be limited to the details herein set forth, but my invention is of the full scope of the appended claims.

I claim:

1. In a device for supporting a pair of diverging gangs of harrow disks, the combination of: a frame adapted to support the disk gangs in fixed tandem angular relationship; a plurality of ground engaging wheels positioned between the disk gangs and adapted to support the frame, said plurality of wheels including a forward wheel positioned in close proximity to the forward end of the forward disk gang, an intermediate wheel positioned at a location near the adjacent ends of the disk gangs, and a rear wheel positioned near the rear disk gang, the distance between the forward wheel and the foremost harrow disk on the forward disk gang being substantially less than the distance from the rear wheel to the rearmost harrow disk on the rear disk gang, the forward and rear wheels being laterally offset to roll in separate paths.

2. In a device for supporting a pair of diverging gangs of harrow disks, the combination of: a frame adapted to support the disk gangs in fixed tandem angular relationship; a plurality of ground engaging wheels positioned between the disk gangs and adapted to support the frame; power means on the frame for raising the frame on said wheels, said plurality of wheels including a forward wheel positioned in close proximity to the forward end of the forward disk gang, an intermediate wheel positioned at a location near the adjacent ends of the disk gangs, and a rear wheel positioned near the rear disk gang, the distance between the forward wheel and the foremost harrow disk on the forward disk gang being substantially less than the distance from the rear wheel to the rearmost harrow disk on the rear disk gang, the forward and rear wheels being laterally offset so that the rear wheel does not roll in the track of the forward wheel.

3. In a disk harrow, the combination of: a pair of gangs of harrow disks; a frame connected to and supporting the disk gangs in fixed tandem diverging relationship; ground engaging wheels positioned between the disk gangs and adapted to support the frame, including a forward wheel positioned adjacent the forward end of the forward disk gang, an intermediate wheel positioned at a location between the adjacent ends of the disk gangs, and a rear wheel positioned near the rear disk gang, the distance between the forward wheel and the foremost harrow disk on the forward disk gang being substantially less than the distance from the rear wheel to the rearmost harrow disk on the rear disk gang, the forward and rear wheels being laterally offset to roll in separate paths.

4. In a disk harrow, the combination of: a pair of gangs of harrow disks; a frame connected to and supporting the disk gangs in fixed tandem diverging relationship; ground engaging wheels positioned between the disk gangs and adapted to support the frame, including a forward wheel positioned adjacent the forward end of the forward disk gang, an intermediate wheel positioned at a location near the adjacent ends of the disk gangs, and a rear wheel positioned near the rear disk gang, the forward and rear wheels being laterally offset to roll in separate paths, the distance between the forward wheel and the foremost harrow disk on the forward disk gang being substantially less than the distance from the rear wheel to the rearmost harrow disk on the rear disk gang, and power means on the frame for raising the frame on said wheels.

5. In a disk harrow, the combination of: a pair of gangs of harrow disks; a frame connected to and supporting the disk gangs in fixed tandem diverging relationship; three ground engaging wheels positioned between the disk gangs and adapted to support the frame, including a forward wheel positioned adjacent the forward end of the forward disk gang; an intermediate wheel positioned at a location near the adjacent ends of the disk gangs, and a rear wheel positioned near the rear disk gang and behind the forward wheel but laterally offset to roll in a separate path, the distance between the forward wheel and the foremost harrow disk on the forward disk gang being substantially less than the distance from the rear wheel to the rearmost harrow disk on the rear disk gang.

6. In a device for supporting a pair of diverging gangs of harrow disks, the combination of: a frame for supporting the disk gangs in fixed tandem angular relationship; three transverse parallel shafts including a forward shaft, an intermediate shaft and a rear shaft; the shafts each being turnably mounted on the frame and each having a crank fixed thereon, the crank on the forward shaft extending forwardly; three ground-engaging wheels positioned between the disk gangs for supporting the frame, including a forward wheel rotatably mounted on the forwardly extending crank of the forward shaft and positioned closely adjacent the foremost harrow disk on the forward disk gang, an intermediate wheel rotatably mounted on the shaft of the second crank and positioned at a location near the adjacent ends of the disk gangs and a rear wheel rotatably mounted on the crank of the rear shaft near the rear disk gang; means including first and second links connecting one of the shafts to each of the others for dependent movement; and means for adjustably varying the effective length of each of said links whereby the frame and diverging disk gangs may be adjustably levelled both longitudinally and transversely.

7. Apparatus as set forth in claim 6 in which power means are provided on the frame and operatively connected to one of the shafts for simultaneously turning the shafts to raise the frame and disk gangs.

8. Apparatus as set forth in claim 6 in which single adjustable stop means are provided at the forward end of the frame and operatively connected to one of the shafts for limiting turning movement of all three shafts in the direction to lower the frame.

9. In a device for supporting a pair of diverging gangs of harrow disks, the combination of: a frame for supporting the disk gangs in fixed tandem angular relationship; three transverse parallel shafts including a forward shaft, an intermediate shaft and a rear shaft; the shafts each being turnably mounted on the frame and each having a crank and a lever fixed thereon, the crank on the forward shaft extending forwardly; three ground-engaging wheels positioned between the disk gangs for supporting the frame, including a forward wheel rotatably mounted on the forwardly extending crank of the forward shaft and positioned closely adjacent the foremost harrow disk on the forward disk gang, an intermediate wheel rotatably mounted on the shaft of the second crank and positioned at a location near the adjacent ends of the disk gangs and a rear wheel rotatably mounted on the crank of the rear shaft near the rear disk gang; means including a first link connecting the levers on the forward and intermediate shafts for dependent movement; means including a second link connecting the levers on the intermediate and rear shafts for dependent movement; each of said links including a turnbuckle for varying the effective length thereof whereby the frame and diverging disk gangs may be adjustably levelled both longitudinally and transversely.

10. In a device for supporting a pair of diverging gangs of harrow disks, the combination of: a frame for supporting the disk gangs in fixed tandem angular relationship; three transverse parallel shafts including a forward shaft, an intermediate shaft and a rear shaft; the shafts each being turnably mounted on the frame and each having a crank fixed thereon, the crank on the forward shaft extending forwardly; three ground-engaging wheels each rotatably mounted upon one of said cranks, for supporting the frame, including a forward wheel positioned closely adjacent the foremost harrow disk on the forward disk gang, an intermediate wheel positioned at a location near the adjacent ends of the disk gangs and a rear wheel positioned near the rear disk gang, the forward and rear wheels being positioned on one side of the frame and the intermediate wheel on the other; the distance between the forward wheel and the foremost harrow disk on the forward disk gang being substantially less than the distance from the rear wheel to the rearmost harrow disk on the rear disk gang, the forward and rear wheels being laterally offset to roll in separate paths, means including first and second links connecting one of the shafts to each of the others for dependent movement; and means for adjustably varying the effective length of each of said links whereby the frame and diverging disk gangs may be adjustably levelled both longitudinally and transversely.

HARRY A. PURSCHE.

References Cited in the file of this patent

UNITED STATES PATENTS

| Number | Name | Date |
|---|---|---|
| 1,092,249 | Emmert | Apr. 7, 1914 |
| 1,301,539 | Cameron | Apr. 22, 1919 |
| 1,931,815 | Conley | Oct. 24, 1933 |
| 2,179,528 | Strandlund | Nov. 14, 1939 |
| 2,268,055 | Neisingh | Dec. 30, 1941 |
| 2,320,742 | Newkirk | June 1, 1943 |
| 2,344,123 | Brown et al. | Mar. 14, 1944 |
| 2,349,257 | Evans et al. | May 23, 1944 |
| 2,356,876 | Newkirk | Aug. 29, 1944 |
| 2,392,006 | Silver | Jan. 1, 1946 |
| 2,458,091 | Moore | Jan. 4, 1949 |
| 2,494,381 | Evans et al. | Jan. 10, 1950 |
| 2,606,414 | Dyrr | Aug. 12, 1952 |